United States Patent
Huang et al.

(10) Patent No.: US 9,100,353 B2
(45) Date of Patent: Aug. 4, 2015

(54) CLOUD SERVER FOR MANAGING HOSTNAMES AND IP ADDRESSES, AND MANAGEMENT METHOD FOR THE CLOUD SERVER

(71) Applicant: Hope Bay Technologies, Inc., Taipei (TW)

(72) Inventors: Wen-Min Huang, Taoyuan County (TW); Pa Hsuan, Taoyuan County (TW)

(73) Assignee: Hope Bay Technologies, Inc., Taipei (TW)

( * ) Notice: Subject to any disclaimer, the term of this patent is extended or adjusted under 35 U.S.C. 154(b) by 246 days.

(21) Appl. No.: 13/826,457

(22) Filed: Mar. 14, 2013

(65) Prior Publication Data
US 2013/0346576 A1    Dec. 26, 2013

(30) Foreign Application Priority Data
Jun. 25, 2012    (TW) .............................. 101122576 A (51) Int. Cl.
G06F 15/173    (2006.01)
H04L 12/741    (2013.01)
H04L 29/12    (2006.01)

(52) U.S. Cl.
CPC .............. *H04L 45/745* (2013.01); *H04L 61/00* (2013.01)

(58) Field of Classification Search
None
See application file for complete search history.

(56) References Cited

U.S. PATENT DOCUMENTS

| | | | | |
|---|---|---|---|---|
| 5,790,548 | A * | 8/1998 | Sistanizadeh et al. | 370/401 |
| 2002/0046293 | A1* | 4/2002 | Kabata et al. | 709/245 |
| 2012/0079055 | A1* | 3/2012 | Robinson | 709/213 |

* cited by examiner

*Primary Examiner* — John B Walsh
(74) *Attorney, Agent, or Firm* — Novak Druce Connolly Bove + Quigg LLP (57) ABSTRACT

A management method for a cloud server for managing IP addresses hostnames, network topology mapping and task synchronization of cloud hosts. The cloud server assigns a temporary IP addresses to host for performing a system boot up and installation task upon a host starting to perform a system boot up and installation task. As the system boot up and the installation task at the host proceeds to a stage, the cloud server receives requests from hosts via a DNS inquiry instruction, and replying the mapping table of a hostnames and a fixed IP addresses to the host via a DNS answer.

18 Claims, 10 Drawing Sheets

CLOUD SERVER FOR MANAGING HOSTNAMES AND IP ADDRESSES, AND MANAGEMENT METHOD FOR THE CLOUD SERVER

BACKGROUND OF THE INVENTION

1. Field of the Invention

The present invention relates to a management method for a cloud server, in particularly, it relates to a management method used for managing hostnames and IP addresses of cloud host in order to perform automatic and synchronize system installation, boot up and deployments among several hosts.

2. Description of Related Art

In recent years, the cloud computing technologies develop rapidly, which leads to the rise of the cloud computing industry. In generally, cloud computing utilizes numerous physical machines and/or virtual machines installed in cloud datacenters connecting to networks via switches for providing cloud computing service to users.

There are hundreds, thousands, or tens of thousands of cloud hosts in a cloud datacenter, including both Physical Machines (PM) and Virtual Machines (VM). The system installation and deployment are inconvenient. It is time consuming to administrators to install and deploy hosts one after another and generates human errors as a result of repetitive installation and deployment of numerous hosts.

In order to overcome the above issues, there are various automatic installation methods devised. These methods installs at least one boot server in a cloud datacenter, and the boot server stores all kinds of data required for installation and deployment of the hosts, such as operation systems, application files etc. When a blank host connects to a switch and booted. After booting, the blank hosts are automatically installed by the boot server without manual operation by administrators.

Nonetheless, the current boot server only performs simple installation and deployment on one host. In other words, the boot server installs operating system and applications in the host and configures settings, and does not provide different system installations according to the functions each host serves afterwards. Thus, when the installation task of the host proceeds to a network installation step, administrators have to look up assigned hostnames and IP addresses of the host. Afterward, the administrators manually setting up the network setting of the host and manually write down Media Access Control (MAC) addresses of the host according to the lookup results. Therefore, the mapping relations of hostnames, IP addresses, and MAC addresses between each hosts in the cloud datacenter brings the conveniences for the future maintenance.

As the mentioned above, the current automatic installation methods for cloud hosts are limited and inconvenient to administrators. As a result, it is desire to provide a new technology to look up the hostnames and the IP addresses of hosts in the installation and deployment of hosts for performing network settings which reduce the manpower of the administrators.

SUMMARY OF THE INVENTION

The objective of the present invention is to provide a cloud server for managing hostnames and IP addresses, and a management method for the cloud server. The method is used for effectively assigning and managing hostnames and IP addresses of hosts in a cloud datacenter, and enabling automation and synchronization when executing system installation, boot up, deployment and other related tasks of hosts in a datacenter.

To achieve the goals mentioned above, the cloud server of the present invention, cloud server, assigns a temporary IP address to a host for performing system boot up and installation task upon a host starts to a system boot up and installation task. When the system boot up and installation proceeds to a stage, the host receives a DNS inquiry instruction from the host, and replies with a DNS answer having a mapping table of a hostnames and a fixed IP address to the host.

The advantage achieve by the present invention is that the cloud server is responsible for managing the hostnames and the IP addresses of all hosts in a cloud datacenter, and the cloud server provides a lookup service of the hostnames and the IP addresses. When the step requires setting the hostname in a network during executing various tasks at each host, each host uses a DNS method for inquiring the cloud server the hostname and IP address of each host and receives DNS answer from the cloud server.

As mentioned above, according to the present invention, cloud system administrators configure settings of a cloud server based on topology of the cloud datacenter and an IP address range, the setup cloud server automatically sets up and assigns hostnames and IP addresses on all hosts in the cloud datacenter. The cloud server replies with a mapping table of hostnames and IP addresses to the hosts when the host sends inquiry which facilitates the automation of system installation and reduce required system setting efforts of administrators on hosts.

Further, when the system boot up and the installation task of each host proceeds to a level, the host is blocked waiting for the cloud server to complete assigning the fixed IP addresses. The cloud server halts the boot up and installation task until the quantity of the blocked host reaches to a certain number, or the cloud server sets a waiting period and a threshold value of blocked hosts, or a timeout period. Then several hosts are allowed to continue executing the following steps. Thus, the system boot up and the installation task of each host are synchronized which effectively lowers the failure rate of automation installation and lowers the quantity of hosts accessing to a boot servers simultaneously.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Embodiments are provided in the following in order to further detail the implementations of the present invention in the summary. It should be noted that objects used in the diagrams of the embodiments are provided with proportions, dimensions, deformations, displacements and details are examples and the present invention is not limited thereto and identical components in the embodiments are the given same component numbers.

Figure 1:
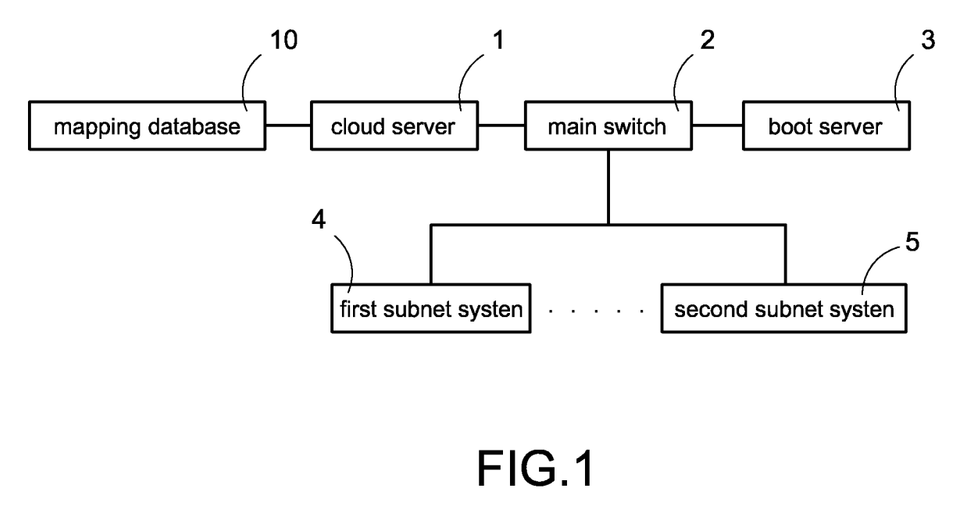
FIG. 1 is a systematic architecture diagram of the first preferred embodiment according to the present invention.
Figure 2:
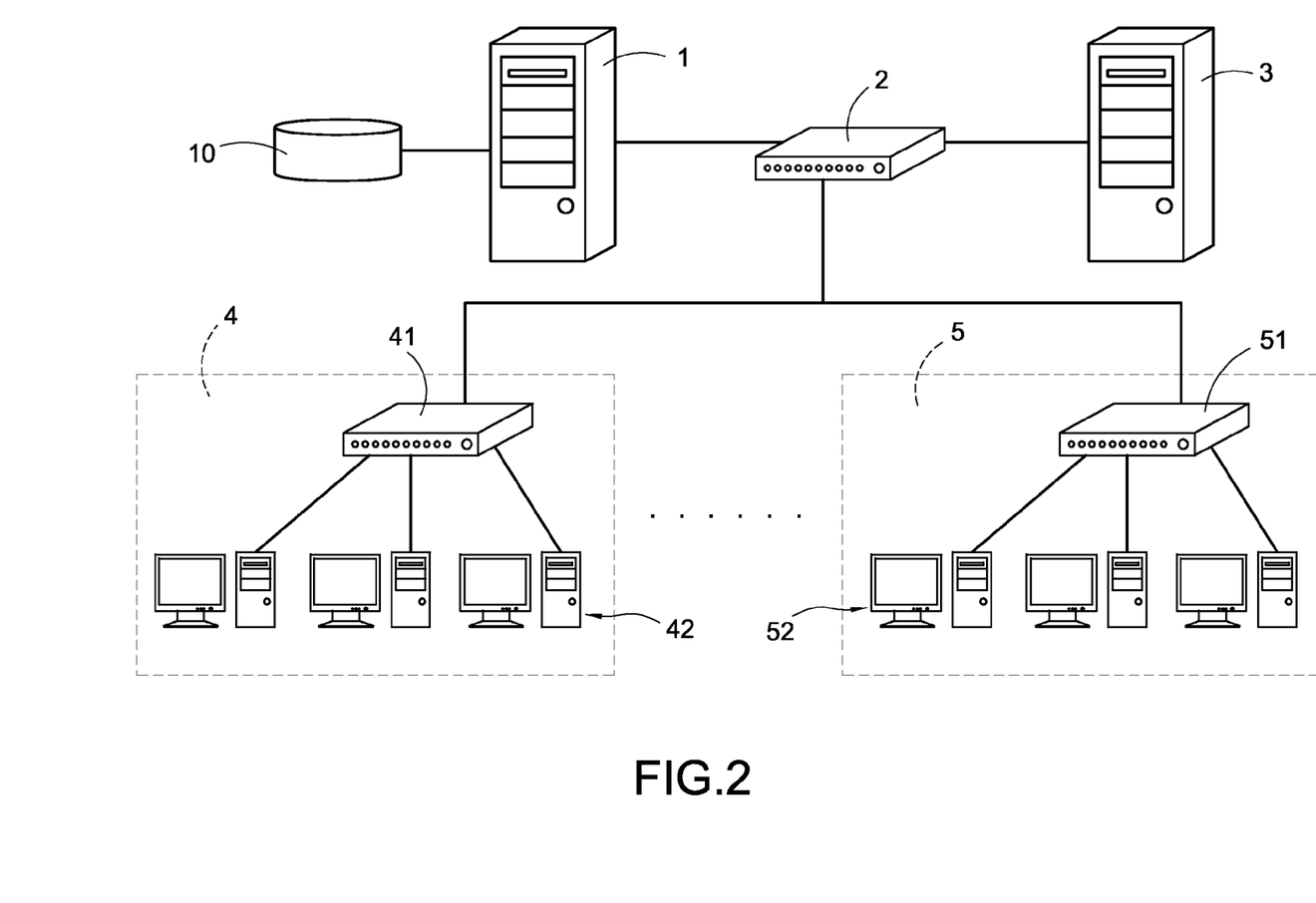
FIG. 2 is a systematic architecture diagram of the second preferred embodiment according to the present invention.

FIG. 1 and FIG. 2 are systematic architecture diagrams of the first and the second preferred embodiments according to the present invention. FIG. 1 and FIG. 2 in the diagrams shows the system architectures of a cloud datacenter, which comprise a cloud domain name service (CDNS) server 1 (referred as the cloud server 1 in the following description), a main switch 2, a boot server 3, and multiple subnet systems 4, 5. In the embodiment, the multiple subnet systems 4, 5 connect to the boot server 3 via the main switch 2 and the cloud server 1, and the quantity is two in the embodiment, but is not limited thereto.

In the embodiment, each subnet system 4, 5 refer to a rack. Accordingly, each cloud datacenter has a large amount of subnet systems. The first subnet system 4 has a first subnet switch 41. The first subnet switch 41 has multiple connection ports for connecting to multiple the first group of hosts 42 (known as a cloud host). The host is a physical machine (PM) or a virtual machine (VM). The hostnames and internet protocol (IP) addresses of both PM or VM are managed by the cloud server 1 (detailed in the following).

The first host 42 connects to the main switch 2 in the upper layer via the first subnet switch 41, and connects to the cloud server 1 and the boot server 3 via the main switch 2 for receiving service of the cloud server 1 and the boot server 3.

The second subnet system 5 has a second subnet switch 51, the second subnet switch 51 also has multiple connection ports for connecting to several second hosts 52 (also including PMs and VMs). The second host 52 connects to the main switch 2 in the upper layer via the second subnet switch 51, and connects to the cloud server 1 and the boot server 3 via the main switch 2. For illustrative purpose, the first group of hosts 42 under the first subnet system 4 is used as an example in the following description.

It should be noted that, according to the present invention, any server in a cloud datacenter can be assigned to execute a specific process serving as the cloud server 1 and the boot server 3 in the present invention. As a result, the cloud server 1 can be any server in a cloud datacenter, or, the cloud server 1 and the boot server 3 are implemented by the same server, and are not limited thereto.

The cloud server 1 is responsible for managing hostnames and IP addresses of all hosts in the cloud datacenter. When a new host is added to the cloud datacenter (for example a new PM is connected, or a new VM is generated) and needs to perform a system boot up and installation task, the host can obtain its own hostnames and IP addresses directly via the cloud server 1. As a result, administrators of the cloud datacenter are not required to manually set up hostnames and IP addresses of the host, which makes the deployment and the installation task automatic processes.

The cloud server 1 is used in cloud system and is a server built based on the domain name system standards. The cloud server 1 supports functions such as DNS forward lookup procedure, reverse lookup procedure, and DNS proxy (detailed in the following). Thus, any host is allowed to inquire the cloud server 1 on the mapping hostname with an IP address, and inquire the cloud server 1 on the mapping IP address via a hostname. IP addresses, hostnames and topology form a map which is a useful management reference to administrators of the cloud server 1 in the cloud datacenter. Substantially, the cloud server 1 connects to an external or internal mapping database 10, the mapping database 10 is used for saving the related data of the hostnames and the IP addresses in the cloud datacenter as the references to the cloud server 1.

Figure 3:
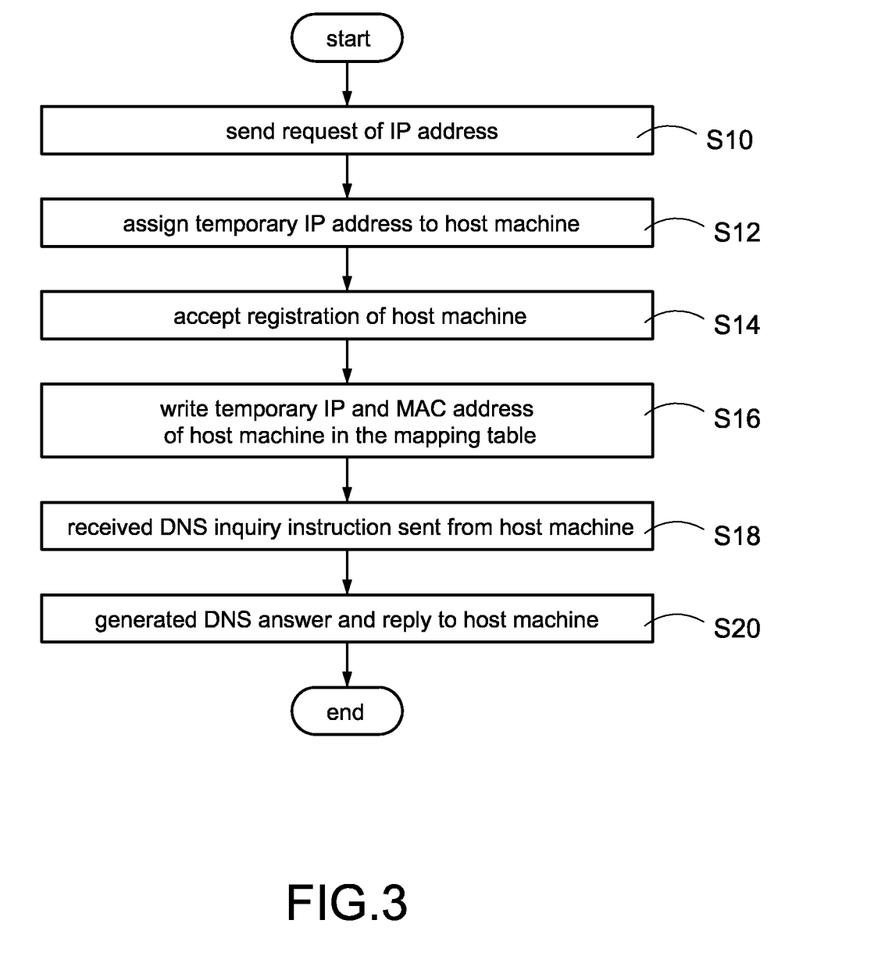
FIG. 3 is a flow chart of the first preferred embodiment according to the present invention.

FIG. 3 is a flow chart of the first preferred embodiment according to the present invention. When any host (the first host 42 is used as the example in the following description) in the cloud datacenter is about to perform the system boot up and the installation task (such as boot up of an operating system and installation), an IP addresses is required. The cloud server 1 receives a request of an IP address sent from the first host 42 (step S10). Next, the cloud server 1 assigns a temporary IP address to the first host 42 based on the request (step S12). The first host 42 connects to the network based on the temporary IP addresses in order to perform the system boot up and the installation task via the boot server 3.

It should be noted that, the temporary IP address is assigned to the first host 42 for executing a boot up or installation and is not a fixed IP address permanently offered to the first host 42. Accordingly, different hosts perform the system boot up and the installation task at different time and in fact may use the same temporary IP address. However, different hosts may use different fixed IP addresses separately to connect to the network upon the system boot up and the installation task is completed. The cloud server 1 has to know an available temporary IP address range, and an available fixed IP address range for successfully assigning temporary IP addresses and fixed IP addresses.

Next, the cloud server 1 accepts the registration of the first host 42 (step S14). More substantially, the first host 42 perform registration at the cloud server 1 based on the temporary IP addresses. After the registration is completed, the cloud server 1 accesses and write the temporary IP address used by the first host 42 and a Media Access Control (MAC) address of the first host 42 in a mapping table (the mapping table 100 shown in FIG. 7) (step S16). The cloud server 1 looks up hostnames of the first host 42 in mapping table 100 afterwards, and the mapping table 100 is saved in the mapping database 10, or directly saves in the cloud server 1, but is not limited thereto.

As shown in Table 1, the cloud server 1 records the related data of each host in the cloud datacenter to the mapping table 100 for lookup. Illustrated hostnames, fixed IP addresses, MAC addresses, and temporary IP addresses in Table 1 are used for exemplary purposes, and are not limited thereto.

TABLE 1

| hostnames | fixed IP addresses | MAC addresses | temporary IP addresses |
|---|---|---|---|
| Host 1 | 192.168.10.1 | 00-AA-BB-50-CC-92 | 192.168.15.1 |
| Host 2 | 192.168.10.2 | 00-CC-DD-45-FF-88 | 192.168.15.2 |
| ... | ... | ... | ... |
| Host n | 192.168.10.n | 00-BC-EF-55-FI-12 | 192.168.15.n |

In the embodiment, before the cloud server 1 is booted up, the administrators have to edit the topology of the cloud datacenter, and the above mentioned available temporary IP address range and the fixed IP address range in a configuration file (the configuration file 1061 shown in FIG. 7), and set up the cloud server 1 based on the configuration file 1061. When the cloud server 1 is booted up, the cloud server 1 automatically assigns a hostname and a fixed IP address mapping on all connection ports of the connected subnet switch (for example the first subnet switch 41) for the hosts connecting to the switch ports based on the configuration file 1061. The cloud server 1 generates a the mapping table 100 as shown in Table 1 and writes the hostnames and the fixed IP addresses in the mapping table 100.

It should be noted that, in the embodiment, the cloud server 1 generates hostnames of hosts based on calculation of algorism with the data of countries, datacenters, cabinets, and switches, connection ports. Accordingly, each host is assigned a hostname distinctive hostnames, which is useful in the management and maintenance of administrators.

After the step S16, the mapping table 100 has complete recording of hostnames, fixed IP addresses, temporary IP addresses, and MAC addresses of all hosts in the cloud datacenter. The cloud server 1 accesses the MAC addresses and writes the MAC addresses in the mapping table 100 upon the first host 42 performs the registration. Further, the cloud server 1 periodically inquires all subnet switches for accessing the MAC address of the hosts connecting to the each connection port of each subnet switch. More substantially, the cloud server 1 periodically inquiries the subnet switch via Simple Network Management Protocol (SNMP), and updates the MAC addresses in the mapping table 100. Nonetheless, the methods and the timing accessing MAC addresses of the hosts by the cloud server 1 is subject to the applied situations and are not limited thereto.

When the first host 42 proceeds to a network installation step, the first host inquires the cloud server 1 for requesting a permanent fixed IP addresses. The cloud server 1 receives a DNS inquiry instruction sent by the first host 42 (step S18). After looking up in the mapping database 10, a mapping table DNS answer is generated and replied to the first host 42 (step S20). The DNS answer comprises data of the hostname and the fixed IP address assigned to the first host 42 by the cloud server 1. More substantially, the DNS answer comprises the data of a hostname and a fixed IP address of a connection port on the first subnet switch 41 assigned by the cloud server 1, where the connection port connects to the first host 42. Consequently, the first host 42 is allocated a hostname and a fixed IP address that are associated to a designated connection port.

In the step S18, the first host 42 sends inquiry to the cloud server 1 via a gethostbyaddr( ) instruction, and in the step S20, the cloud server 1 processes the DNS inquiry instruction based on a DNS reverse lookup, and generates the DNS answer.

More substantially, the gethostbyaddr( ) instruction sends an IP addresses (for example 192.168.1.1) to the DNS server, the DNS server performs the DNS reverse lookup procedure for converting the mapping a domain name (for example www.delta.com.tw). The domain name is replied as a DNS answer. In other words, with the present invention, the service call of an operating system can be utilized for using the cloud server, instead of proprietary applications. In the step S18, the first hosts 42 sends the DNS inquiry instruction to the cloud server 1 (wherein the DNS inquiry instruction comprises the temporary IP address used by the first host 42). The cloud server 1 looks up the mapping table 100 with the DNS inquiry instruction for accessing the data of the hostname and the fixed IP address of the first host 42 connecting to the connection port, then generates the DNS answer compliant with DNS rules. As mentioned above, the DNS answer have to comprise the data of the hostname and the fixed IP address assigned to the first host 42, and have to be in compliance with DNS rules. For example, the format of the DNS answer is "hostnames.fixed_IP_address.delta.com.tw but is not limited thereto. The first host 42 receives the DNS answer and attains the mapping table of the hostnames and data of the fixed IP addresses from the DNS answer.

When several hosts simultaneously perform the system boot up and the installation task, the cloud server 1 simultaneously receives DNS inquiries sent by multiple hosts, and simultaneously replies to multiple hosts with the DNS answer, the above embodiment use the first host 42 alone as an illustrative example, but is not limited thereto.

Figure 4:
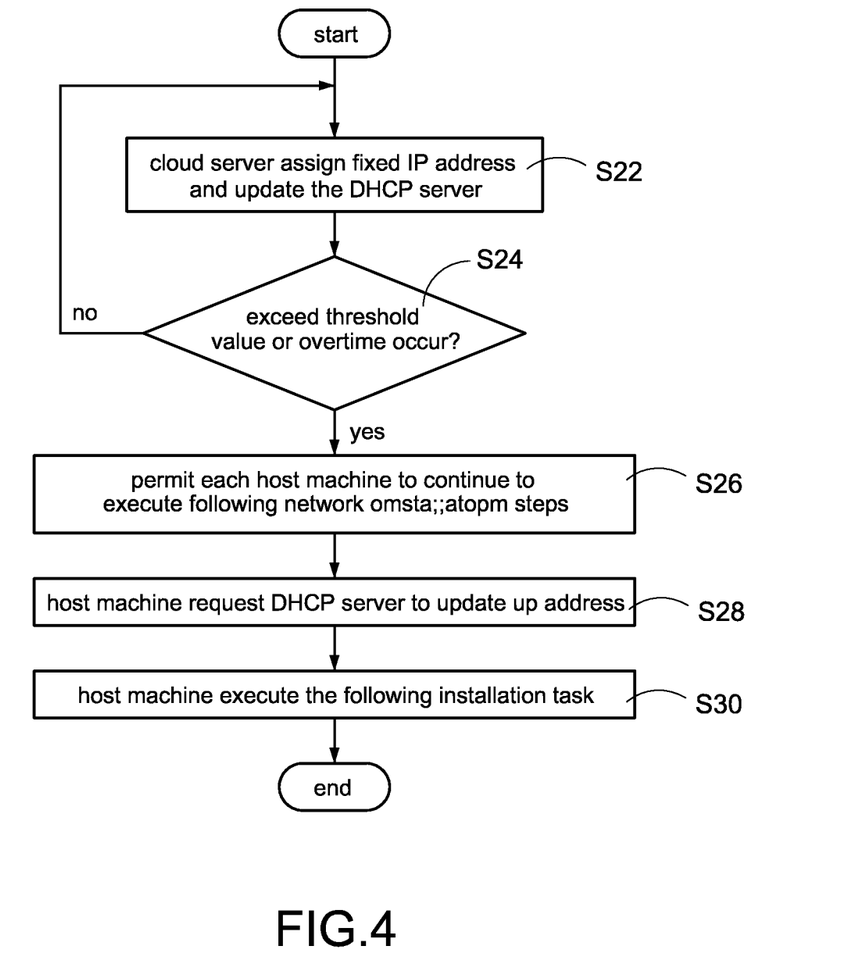
FIG. 4 is a flow chart of the second preferred embodiment according to the present invention.
Figure 5:
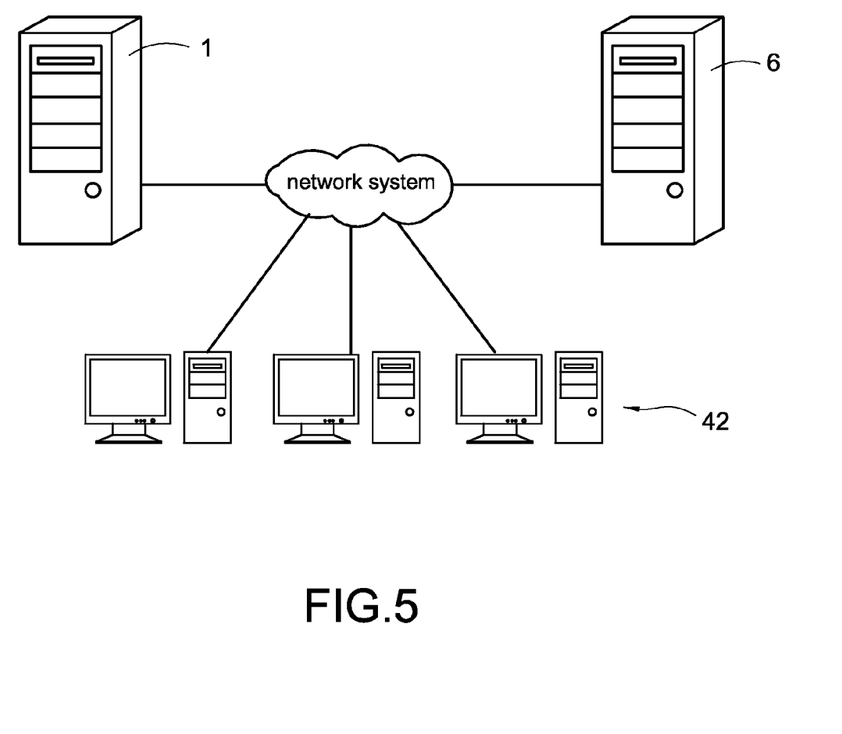
FIG. 5 is a systematic architecture diagram of the third preferred embodiment according to the present invention.

FIG. 4 is a flow chart of the second preferred embodiment according to the present invention and FIG. 5 is a systematic architecture diagram of the third preferred embodiment according to the present invention. As the mentioned above, when the first host 42 performs an installation task, the cloud server 1 requests the first host 42 to stay in the block state. Next, the cloud server 1 starts to configure the IP address and hostname assignment. While network configuration is done by the cloud server 1, the cloud server 1 sends an unblock message to the blocked first host 42. Eventually, the first host 42 can obtain a pair of designated hostname and IP address through the DNS reverse lookup procedure and dynamic host configuration protocol (DHCP), respectively. As shown in FIG. 5, the cloud datacenter has the DHCP server 6. The DHCP server 6 connects to the cloud server 1 and the first host 42 via network system. DHCP is known to people skilled in the art and is not repeated in the description. By the way, if other hosts also perform the system boot up and the installation task at the same time, when the task proceeds to the network installation step, these hosts are also blocked as the same as the first host 42 to wait for the coming operation step of the cloud server 1.

To reduce the failure rate of the installation task and synchronize the network installation steps, a kind of waiting block method is needed. During the network installation step of the hosts, after the cloud server 1 configures and updates the DHCP server 6 (step S22), the cloud server 1 unblocks the blocked hosts under the following conditions. The amount of blocked hosts exceeds a threshold value, or the waiting time of the blocked hosts is timeout (step S24). Next, the cloud server 1 broadcasts notification packets to unblock the blocked hosts to continue the following network installation steps (step S26). In particularly, the cloud server 1 broadcasts the notification packets to the blocked hosts in multicast manner, but not limited to.

After the step S26, the host (for example the first host 42) requests for renewing the IP address and hostname from the DHCP server 6 and from the DNS reverse lookup (step S28), respectively. Finally, the first host 42 gets a designated fixed IP addresses and continues to perform the remaining process (step S30).

It should be noted that the embodiment of the present invention, the host is blocked for waiting the network configuration of the cloud server 1 However, the cloud server 1 also resolves the synchronization issue of distributed applications occurring to cloud clusters during system boot up. In other words, when the hosts individually launch a distributed application, the hosts' program initial sequences are controlled by the cloud server 1. As the specific process is executed, the hosts are blocked until an unblock condition occurs, the cloud server 1 collectively unblock the blocked hosts in multicast manner. Accordingly, executing synchronization of a distributed application is kept.

Figure 6:
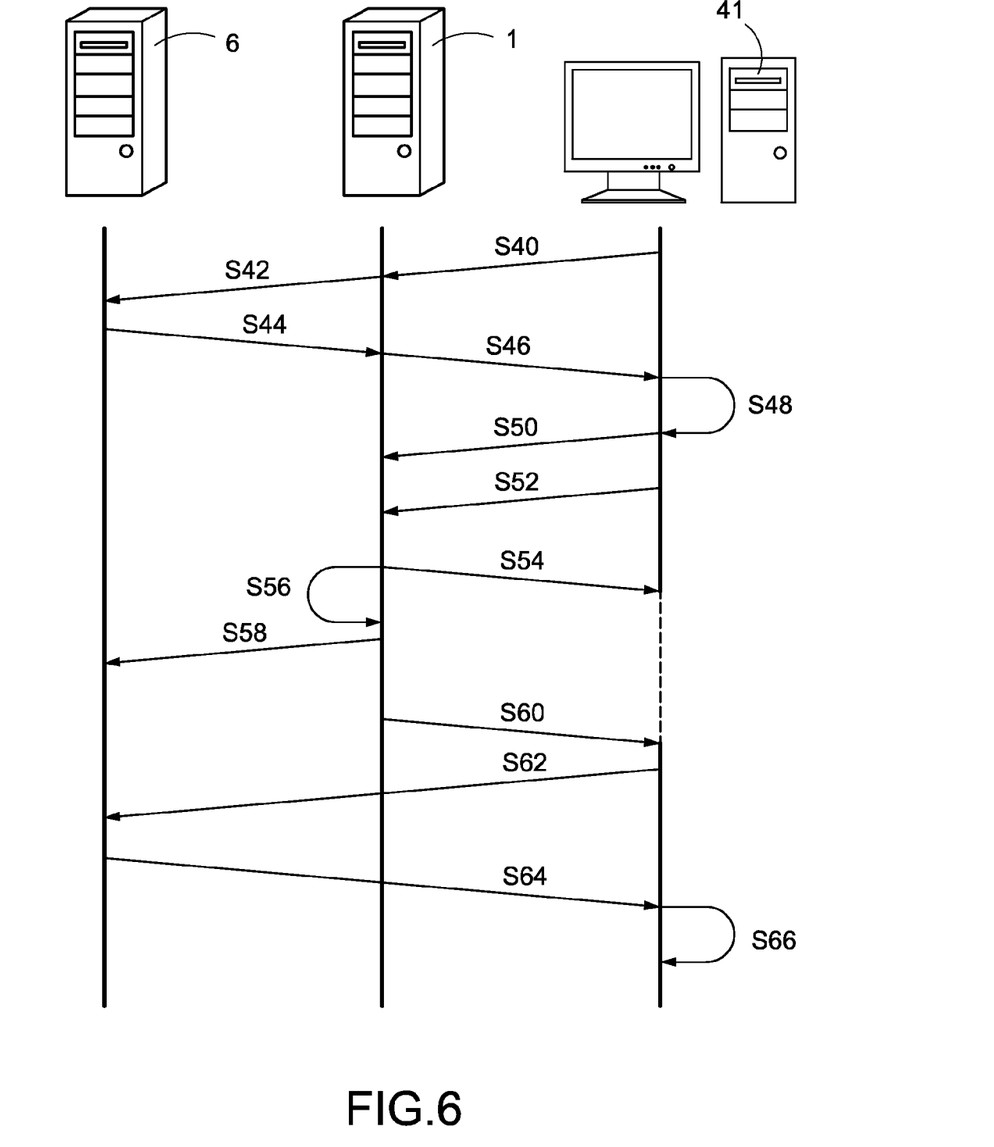
FIG. 6 is a flow chart of the second preferred embodiment according to the present invention.

FIG. 6 is a flow chart of the second preferred embodiment according to the present invention. FIG. 6 illustrates in details of operation steps performed by the cloud server 1, the first host 41, and the DHCP server 6, and the sequence of operation steps.

First, when the first host 41 sends a request of an IP address for the network installation step to the cloud server 1 during starting to perform the system boot up and installation task (step S40). When the cloud server 1 receives the request, the cloud server 1 updates the DHCP server 6 (step S42). The DHCP server 6 selects a temporary IP address to reply to the cloud server 1 based on the available temporary IP address range (step S44). The cloud server 1 assigns the temporary IP addresses to the first host 42 (step S46).

After the first host 42 gets the temporary IP address in the step S46, the system boots up and the installation task of the operating system are performed (step S48). When the system boots up and the installation tasks execute to a certain stage, the first host 42 registers the temporary IP addresses to the cloud server 1 (step S50) and the cloud server 1 updates mapping table 100. Next, when the installation tasks of the first host 42 executes to the network installation step, the DNS inquiry instruction with the temporary IP address of the first host 42 (the gethostbyaddr( ) instruction in the embodiment) is used to send a DNS inquiry to the CDNS server 1 (step S52). The cloud server 1 receives the DNS inquiry instruction then the temporary IP address of the first host 42 is used to perform the DNS reverse lookup procedure and generates the DNS answer to reply to the first host 42 (step S54). At this step, the first host 42 is blocked, the system boot up and installation task process are suspended.

Next, according to the topology configuration, the cloud server 1 assigns the fixed IP address to the first host 42 (step S56), and updates the DHCP server 6 (step S58). After finishing updating the network configuration, the cloud server 1 prepares to unblock all blocked hosts in multicast manner (step S60), and the blocked hosts including the first host 42 mentioned above for example in this embodiment.

After the step S60, the first host 42 gets the hostname and data of the fixed IP address from the DNS answer and continues the network installation step. At the same time, the first host 42 requests the DHCP server 6 to update addresses (step S62). The DHCP server 6 assigns the fixed IP address to the first host 42 based on the update of the cloud server 1 (step S64). After the step S64, the first host 42 uses the hostname and the assigned fixed IP address to complete the network installation step, and continue the following processes (step S66).

After the step S66, the first host 42 is a complete and usable cloud host, and administrators manage and control the first host 42 based on the hostname and the fixed IP address of the first host 42.

Figure 7:
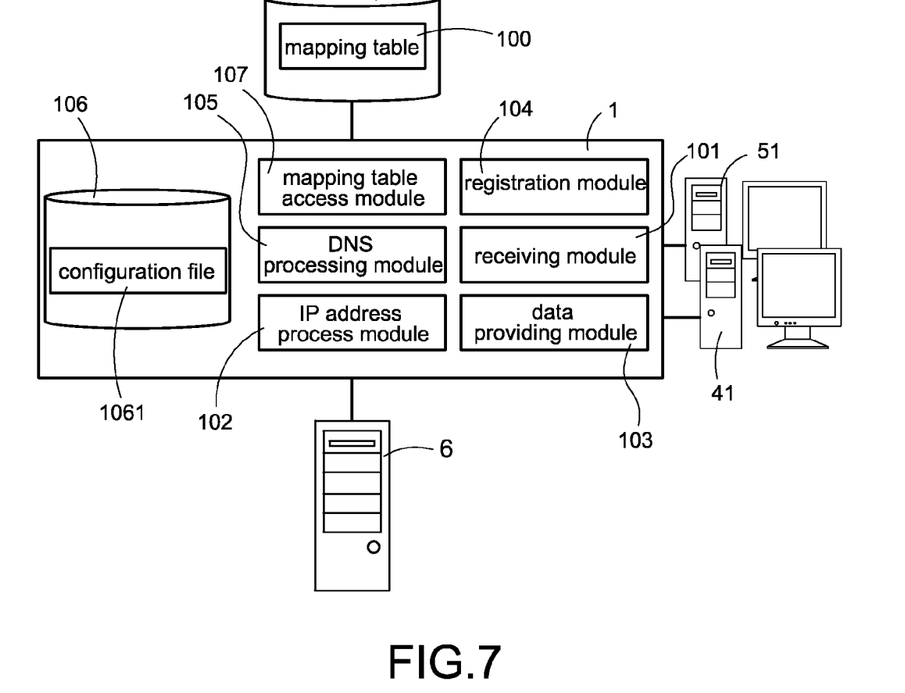
FIG. 7 is a cloud server architecture diagram of the second preferred embodiment according to the present invention.

FIG. 7 is a cloud server architecture diagram of the second preferred embodiment according to the present invention. The specific processes mentioned above comprise multiple sets of program codes. With the program codes running, the cloud server 1 differentiates multiple modules therein. The cloud server 1 comprises a receiving module 101, an IP address process module 102, a data providing module 103, the registration module 104, a DNS processing module 105, a storage module 106, and a mapping table access module 107.

The receiving module 101 receives the request of an IP addresses sent by the first host 42 The IP address process module 102 requests the DHCP server 6 to assign the temporary IP address based on the request. The cloud server 1 assigns the temporary IP address to the first host 42 via the data providing module 103. When the system boot up and the installation task of the first host 42 proceeds to the network installation step, the cloud server 1 accepts the registration of the first host 42 performed by the registration module 104. The temporary IP addresses and the MAC addresses of the first host 42 are written in the mapping table 100.

When the first host 42 sends the DNS inquiry instruction, the cloud server 1 receives and processes the DNS inquiry instruction with the DNS processing module 105. More substantially, the DNS processing module 105 processes the DNS reverse lookup procedure to look up in the mapping table with the DNS inquiry instruction for accessing the hostname and data of the fixed IP address of the first host 42 assigned by the cloud server 1. The DNS reverse lookup procedure generates the DNS answer. The cloud server 1 replies to the first host 42 with the DNS answer via the data providing module 103.

The storage module 106 is used for saving the configuration file 1061. The administrators of the cloud datacenter write the configuration file 1061 and save the configuration file 1061 in the storage module 106 before the cloud server 1 boots up, and set the cloud server 1 based on the configuration file 1061. Thus, when the cloud server 1 boots up, the cloud server 1 assigns a hostname and a fixed IP address automatically to each connection ports of the connected subnet switch (for example the first subnet switch 41) based on the configuration file 1061.

The cloud server 1 connects to the mapping database 10 for accessing the mapping table 100 via the mapping table access module 107. However, the mapping table 100 can be saved in the cloud server 1, i.e. saved in the storage module 106. The data is writing in and read from the storage module 106 via the mapping table access module 10. The above embodiment is one of the preferred embodiments according to the present invention and is not limited thereto.

The architecture mentioned in FIG. 1 and FIG. 2 is a centralized architecture, which has only one cloud server 1 and one boot server 3 and provides services to all subnet systems 4, 5 in a cloud system via the main switch 2. The present invention also discloses the other architecture, a distributed architecture having several cloud servers 1 and several boot servers 3, and also is also works with the management method of the present invention.

Figure 8:
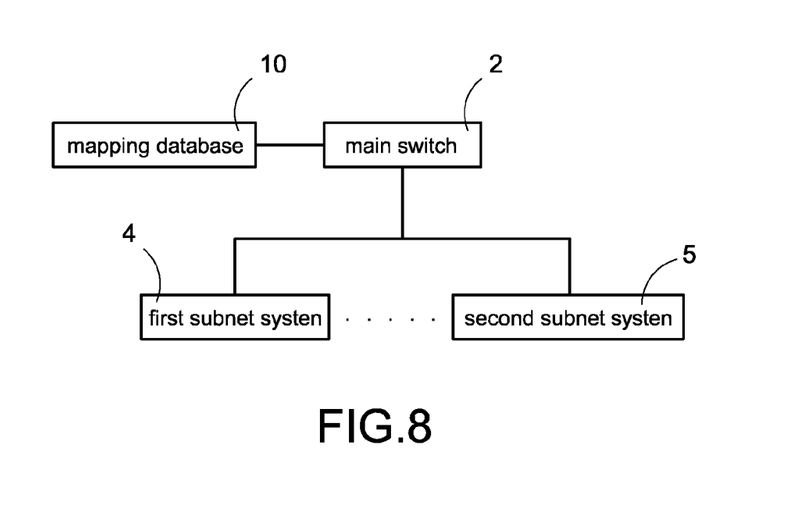
FIG. 8 is a systematic architecture diagram of the fourth preferred embodiment according to the present invention.
Figure 9:
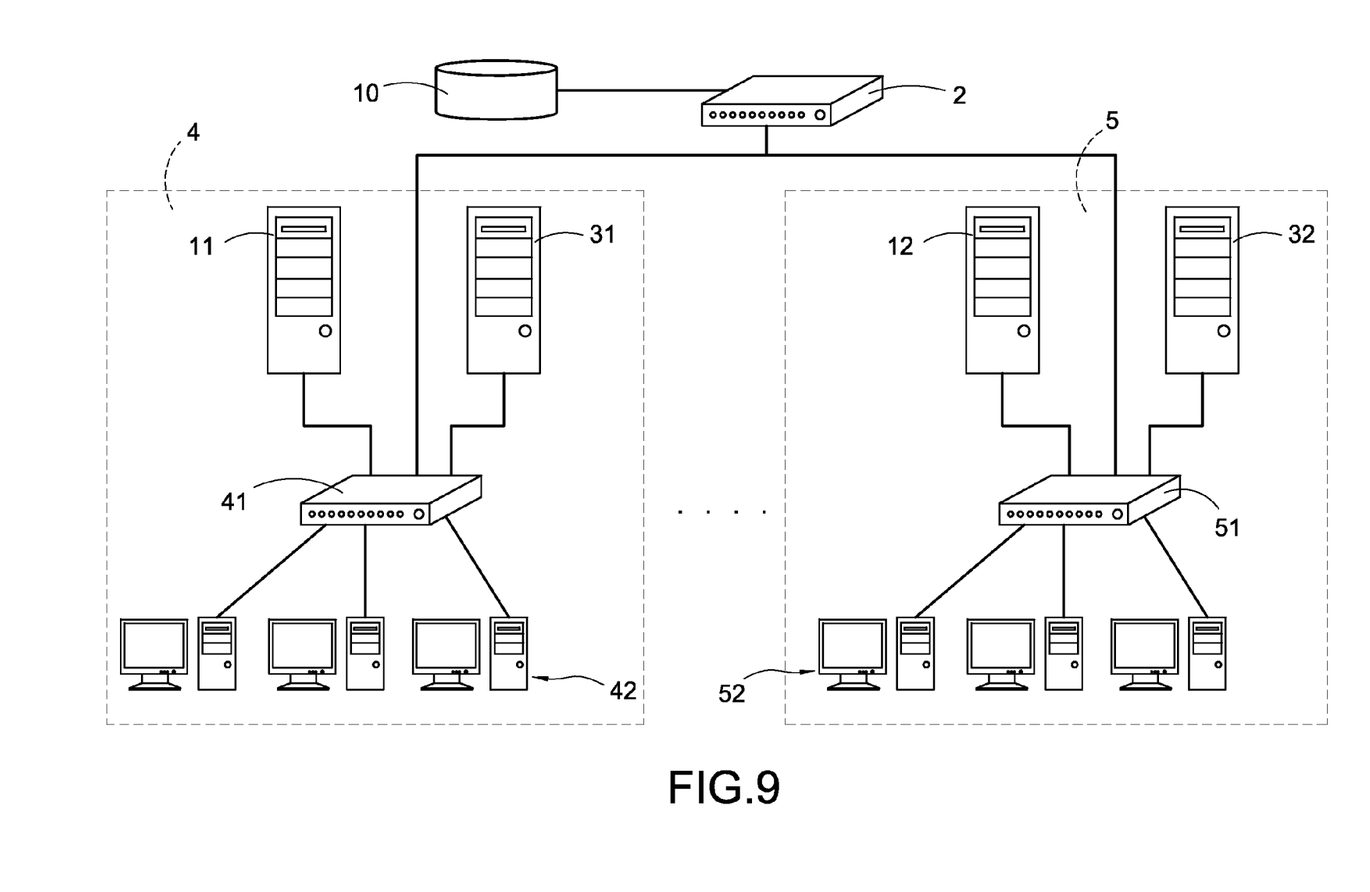
FIG. 9 is a systematic architecture diagram of the fifth preferred embodiment according to the present invention.

FIG. 8 is a systematic architecture diagram of the fourth preferred embodiment according to the present invention and FIG. 9 is a systematic architecture diagram of the fifth preferred embodiment according to the present invention. In the embodiment, the main switch 2 directly connects to the mapping database 10, instead of the cloud server 1 and the boot server 3. In the embodiment, each subnet system 4, 5 is respectively installed with a cloud server 11, 12 and a boot server 31, 32. In FIG. 9, the cloud server 11 and the boot server 31 provide services to the physical machine 42 of the first subnet system 41, the cloud server 12 and the boot server 32 provide services to the physical machine 52 of the second subnet system 51.

Taking the first subnet system 41 as an example, when multiple first hosts 42 request temporary IP addresses, the requests are sent to the cloud server 11 of the first subnet system 41, and when the multiple first hosts 42 need to perform the boot up process, the boot up process of the first hosts 42 are launched via the boot server 31 of the first subnet system 41. The cloud server 11 stores the related data of the first host 42 (for example the mapping table 100) in the mapping database 10 via an upper network layer. In other words, the cloud server 11 and the boot server 31 provide services to the first subnet system 41, the generated loading is lower than the generated loading of the cloud server 1 illustrate in the previous embodiment. More substantially, in a cluster system, each subnet system 4, 5 are in separated surroundings. The architecture of the embodiment keeps the network traffic resource of each subnet system 4, 5 at the local ends without interfering the resource of the whole network. In other words, given the cloud server 11 and the boot server 31 of the first subnet system 41 fail, the processes in other subnet systems and upper network layer are not affected.

Figure 10:
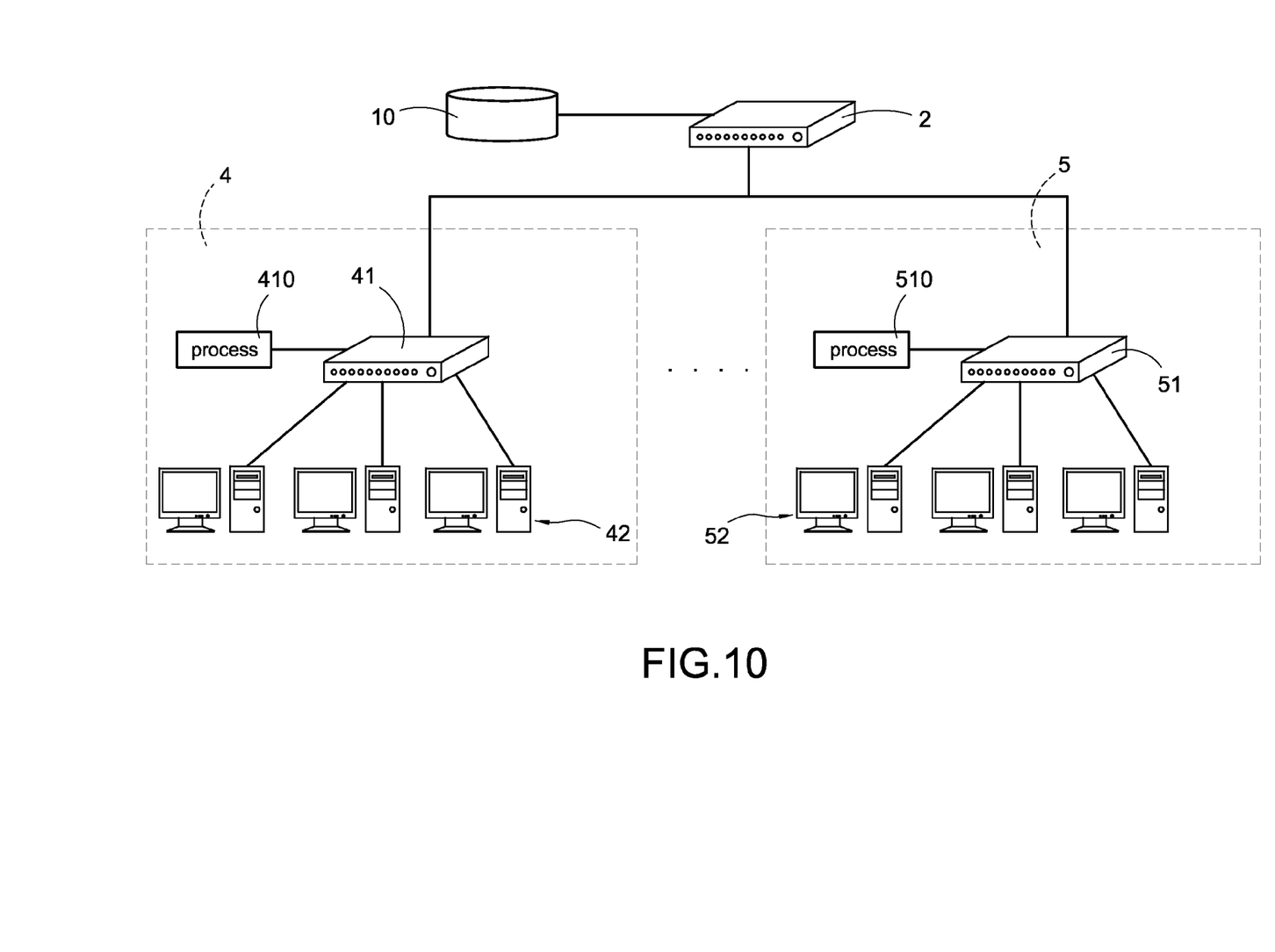
FIG. 10 is systematic architecture diagram of the sixth preferred embodiment according to the present invention.

As mentioned above, any of the cloud servers 1, 11, 12 and the boot server s3, 31, 32 serves to execute a specific process in order to perform a designated function. FIG. 10 is a systematic architecture diagram of the sixth preferred embodiment according to the present invention. In the embodiment, the cloud servers 11, 12 and the boot servers 31, 32 are not physical server. The system installed with subnet switches 41, 51 having high hardware performance, and the subnet switches 41, 51 respectively execute a process 410, 510. In the embodiment, the first subnet switch 41 internally executes the process 410, and after the process 410 is launched, the first subnet switch 41 works as a switch, a cloud server and a boot serve providing services to all first hosts 42 of the first subnet system 4. The second subnet switch 51 internally executes the process 510, and after the process 510 is launched, the second subnet switch 51 works as a switch, a cloud server and a boot server providing services to all second hosts 52 of the second subnet system 5. The advantage of the embodiment reduces the management server quantity in a cabinet and lowers the building costs of cloud systems.

The cloud servers 1, 11, 12 disclosed in the present invention can be implemented with a 3-tier architecture providing simultaneously DNS service among multiple zones, managing and assigning IP addresses and hostnames. The 3-tier architecture is basic skills in the related art and is not repeated in the description.

Figure 11:
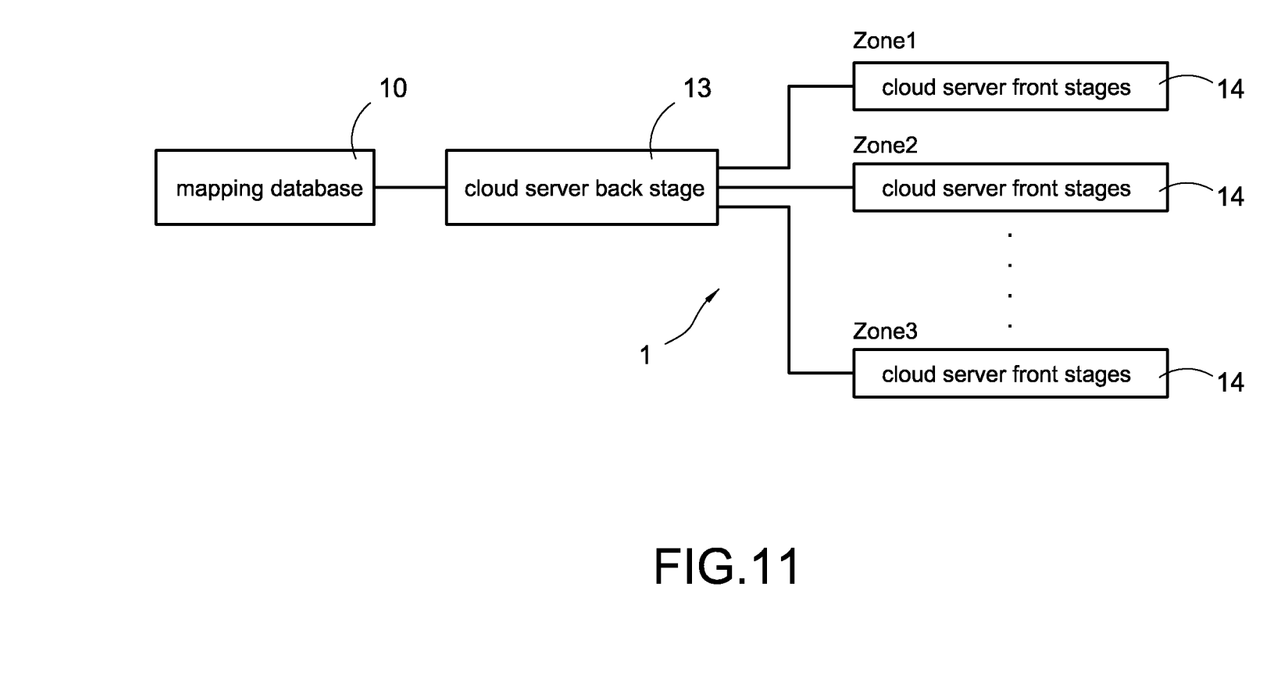
FIG. 11 is a CDNS server architecture schematic diagram of the first preferred embodiment according to the present invention.

FIG. 11 is a CDNS server architecture schematic diagram of the first preferred embodiment according to the present invention. A complete cloud server 1 comprises a mapping database 10, a cloud server back stage 13, and one or multiple cloud server front stages 14. The mapping database 10 is the data tier in the 3-tier architecture used for saving data, the cloud server back stage 13 is the application tier in the 3-tier architecture used for logic computing; and the plurality of cloud server front stages 14 are the presentation tier in the 3-tier architecture used for installation in different zones, as interfaces for different client ends. More substantially, the plurality of cloud server front stages 14 respectively are used for receiving data inputs from each client ends which then offered to the cloud server back stage 13, and displaying computing results of the cloud server back stage 13 for the end clients.

With the architecture of the embodiment, the cloud server 1 simultaneously manages multiple zones, and is scalable with the divisions of the front stage and the back stage.

As the skilled person will appreciate, various changes and modifications can be made to the described embodiments. It is intended to include all such variations, modifications and equivalents which fall within the scope of the invention, as defined in the accompanying claims.

What is claimed is:

1. A management method for a cloud server, the management method used in connecting the cloud server to a host and managing the host, the cloud server connecting to the host via a subnet switch in a cloud datacenter and the host connecting to a connection port on the subnet switch, the management method comprising:

a01) establishing a configuration file, the configuration file comprising a topology and an available fixed IP address range of the cloud datacenter;

a02) assigning a host name and a fixed IP address of all connection ports on the subnet switch based on the topology and the fixed IP address range; and a03) generating a mapping table, and writing the host name and the fixed IP address in the mapping table;

a) receiving a request of IP addresses from the host;

b) assigning a temporary IP address to the host based on the request;

c) accepting the temporary IP address used by the host for performing registration, and the temporary IP address being written in the mapping table;

d) receiving a Domain Name System (DNS) inquiry instruction from the host after the registration, the DNS inquiry instruction comprising the temporary IP address;

e) looking up in a mapping table, based on the temporary IP address of the DNS inquiry instruction for processing a DNS reverse lookup procedure, and generating a DNS answer replying to the host, wherein the DNS answer comprises data of the host name and the fixed IP addresses which are assigned to the host, and the DNS inquiry instruction is used for looking up in the mapping table for accessing the data of the host name and the fixed IP address of the connection port connected with the host.

2. The management method of claim 1, wherein the DNS inquiry instruction is a gethostbyaddr( ) instruction.

3. The management method of claim 1, wherein the configuration file further comprises an available temporary IP address range and the step b comprise requesting a Dynamic Host Control Protocol (DHCP) server to assign the temporary IP addresses to the host according to the temporary IP address range.

4. The management method of claim 1, wherein the method further comprising:

f) inquiring the subnet switch periodically; and g) accessing a Media Access Control (MAC) address of the host, and writing the MAC addresses in the mapping table.

5. The management method of claim 4, wherein the step f comprises inquiring the subnet switch periodically via a Simple Network Management Protocol (SNMP).

6. The management method of claim 1, wherein the step a comprises receiving the request of the IP addresses from the host when the host performs a system boot up and an installation task via a boot server.

7. The management method of claim 6, wherein when the host performs a network installation step in the system boot up and the installation task, the host is blocked and the step e further comprises:

h) performing an update of a DHCP server based on the data of the fixed IP addresses;

i) determining whether a quantity of the blocked hosts exceeds a threshold value, or whether a timeout occurred;

j) when the quantity of the blocked hosts exceeds the threshold value, or when the timeout occurred, unblocking the blocked host to continue to perform the network installation step;

k) the host sending an address update request to the DHCP server based on the data of the fixed IP address; and l) the DHCP server assigning the fixed IP address to the host based on the update of the cloud server and the request from the host.

8. The management method of claim 7, wherein the blocked hosts are unblocked collectively via multicasting in the step j.

9. A management method for a cloud server, the cloud server connecting to a host via a subnet switch, and the host connecting to a connection port of the subnet switch, the management method comprising:
   a) assigning a host name and a fixed IP address for all connection ports on the subnet switch, and writing the host name and the fixed IP address in a mapping table;
   b) receiving a request of IP address from the host when the host performs a system boot up and installation task via a boot server;
   c) requesting a temporary IP address from a DHCP server based on the request;
   d) assigning the temporary IP addresses to the host for performing the system boot up and the installation task;
   e) accepting the host using the temporary IP addresses when performing a registration;
   f) accessing a MAC addresses of the host;
   g) writing the temporary IP addresses and the MAC addresses in the mapping table after the registration is accepted;
   h) receiving a DNS inquiry instruction sent by the host, wherein the DNS inquiry instruction comprises the temporary IP address;
   i) looking up in the mapping table based on a DNS reverse lookup, for generating a DNS answer replying to the host, wherein the DNS answer comprises data of the host name and of the fixed IP address assigned to the connection ports connected with the host.

10. The management method of claim 9, wherein the DNS inquiry instruction is a gethostbyaddr( ) instruction.

11. The management method of claim 9, wherein the subnet switch is installed in a cloud datacenter, the step a further comprises the following steps:
   a1) establishing a configuration file, wherein the configuration file comprises a topology of the cloud datacenter, and an available fixed IP address range;
   a2) assigning a host name and a fixed IP address for each connection port on the subnet switch based on the topology and the fixed IP address range; and
   a3) writing the host name and the fixed IP address in the mapping table.

12. The management method of claim 11, wherein the step f comprises:
   f1) inquiring periodically the subnet switch via a Simple Network Management Protocol (SNMP); and
   f2) accessing the MAC address of the host based on inquiry result.

13. The management method of claim 11, wherein when the host performs a network installation step in the system boot up and the installation task, the host is blocked and the method further comprises the following steps after the step i:
   j) performing an update of the DHCP server based on the data of the fixed IP address;
   k) unblocking the blocked the host to continue to execute the network installation step when the update is completed;
   l) unblocking the blocked host to continue to execute the network installation step if the quantity of the blocked hosts exceeds a threshold value; and
   m) unblocking the blocked host to continue to execute the network installation step if a timeout occurred to the host.

14. The management method of claim 13, wherein the blocked hosts are unblocked collectively via multicasting in the step in the step k, step l and step m.

15. The management method of claim 13, wherein comprising the following steps:
   n) the host sending an address update request to the DHCP server based on the data of the fixed IP address; and
   o) the DHCP server assigning the fixed IP address to the host based on the update of the cloud server and the request from the host.

16. A cloud server for managing host names and IP addresses used for connecting to a host and managing the host, the cloud server connecting to the host via a subnet switch in a cloud datacenter and the cloud server comprising at least one processor and a storage module, the cloud server further comprising:
   a receiving module executed by the at least one processor, receiving a request of IP addresses from the host;
   an IP address process module executed by the at least one processor, accepting the temporary IP address used by the host for performing registration;
   a data providing module executed by the at least one processor, assigning a temporary IP address to the host based on the request;
   a registration module executed by the at least one processor, receiving an inquiry instruction of the Domain Name System (DNS) from the host after the registration; and
   a DNS processing module executed by the at least one processor, receiving a DNS inquiry instruction sent from the host after the registration, and generating a DNS answer based on a DNS reverse lookup processing the DNS inquiry instruction;
   wherein, the cloud server replying to the host with the DNS answer via the data providing module, and the DNS answer comprising the data of a permanent host name and a permanent fixed IP address to the host assigned by the cloud server, and the storage module saving a configuration file, the configuration file comprising a topology of the cloud datacenter, and an available fixed IP address range, and the cloud server assigns a host name and a fixed IP address for all connection ports on the subnet switch via the topology and the fixed IP address range.

17. The cloud server of claim 16, wherein the cloud server comprises a mapping table access module, used for accessing the mapping table, the mapping table further records the temporary IP address, a MAC address of the host, and the assigned the host names and the fixed IP addresses of the connection port connected to the host, the DNS inquiry instruction comprises the temporary IP address, the DNS processing module looks up in the mapping table with the DNS inquiry instruction, for accessing the mapping table host name and data of the fixed IP address and generating the DNS answer.

18. The cloud server of claim 16, wherein the IP address process module performs an update of a Dynamic Host Control Protocol (DHCP) server based on the data of the fixed IP addresses for sending a request of permission for using the fixed IP addresses to the DHCP server.

* * * * *